(12) United States Patent
Bertocchi

(10) Patent No.: US 7,636,620 B2
(45) Date of Patent: Dec. 22, 2009

(54) SIGNAL DISTRIBUTION DEVICE OPERATING IN AIRCRAFT INSTRUMENTAL LANDING SYSTEMS

(75) Inventor: Giuseppe Bertocchi, Bergamo (IT)

(73) Assignee: Thales Italia S.p.A. (IT)

( * ) Notice: Subject to any disclaimer, the term of this patent is extended or adjusted under 35 U.S.C. 154(b) by 658 days.

(21) Appl. No.: 11/007,187

(22) Filed: Dec. 9, 2004

(65) Prior Publication Data

US 2006/0030976 A1 Feb. 9, 2006

(30) Foreign Application Priority Data

Dec. 10, 2003 (EP) .................................. 03425789

(51) Int. Cl.
*G01S 1/00* (2006.01)
*G01S 1/10* (2006.01)
*G01S 1/14* (2006.01)
*G01S 1/18* (2006.01)

(52) U.S. Cl. ..................... 701/16; 701/3; 701/4; 701/5; 701/17; 701/18; 342/385; 342/410; 342/411; 342/412; 342/413; 342/414; 342/415; 342/416; 340/947; 340/951; 340/952

(58) Field of Classification Search ...................... 701/1, 701/3–5, 16–18; 342/385–416; 340/947–957, 340/967
See application file for complete search history.

(56) References Cited

U.S. PATENT DOCUMENTS

| | | | |
|---|---|---|---|
| 3,713,160 A | * | 1/1973 | Becavin ....................... 342/414 |
| 3,866,228 A | | 2/1975 | Alford |
| 3,964,067 A | * | 6/1976 | Lucas ......................... 342/412 |
| 4,032,920 A | | 6/1977 | Martin, Jr. et al. |
| 4,164,743 A | * | 8/1979 | Lucas et al. ................. 342/412 |
| 4,599,621 A | * | 7/1986 | Rausch ....................... 342/410 |
| 4,876,548 A | * | 10/1989 | Lopez ......................... 342/368 |
| 5,546,095 A | * | 8/1996 | Lopez ......................... 343/703 |
| 6,097,338 A | * | 8/2000 | Rupprecht et al. .......... 342/412 |

\* cited by examiner

*Primary Examiner*—Jack W. Keith
*Assistant Examiner*—Chuong P Nguyen
(74) *Attorney, Agent, or Firm*—Lowe Hauptman Ham & Berner, LLP

(57) ABSTRACT

A distribution device for a glide guidance component, the distribution device including an array of antenna elements installed on a pylon. The distribution device includes: a first and a second input for receiving a CSB (carrier plus sideband) input signal and an SBO (sideband only) input signal respectively, a plurality of outputs connectable to the array and including a first and a second output for the first and second output signals, respectively; each of said output signals including a CSB component and an SBO component. The array of antenna elements is such as to irradiate an image-less type pattern and the distribution device is such that the outputs have an substantially equal amplitude value for each pair arranged symmetrically around a central point of the array and a phase difference which is identical for the two CSB and SBO components.

11 Claims, 5 Drawing Sheets

SIGNAL DISTRIBUTION DEVICE OPERATING IN AIRCRAFT INSTRUMENTAL LANDING SYSTEMS

BACKGROUND OF THE INVENTION

1. Field of the Invention

The present invention relates to the aircraft instrumental landing system (ILS) sector and to the so-called glide path (GP) systems and i.e. to guiding aircraft glide.

2. Description of the Prior Art

Within conventional GP systems, an antenna which emits signals is used, installed within the airport in close proximity to the landing runway, from which aircraft obtains information regarding the progress of descent manoeuvres and, in particular, regarding the angle of inclination with respect to the horizon of the path followed by the aircraft.

GP systems which use the irradiation of two particular signals are known, the characteristics of which (usable frequencies, modulation type and the antenna radiation patterns) are, for many aspects, fixed by international regulations. Such signals, emitted in order to guide the descent or glide are: a "carrier plus side band" (CSB) signal, and a "side band only" (SBO) signal.

Typically, the antenna system used is made up of an array of two or three radiating elements, each of which emits a CSB or SBO signal in such a manner that, together with the signals reflected from the ground, the irradiated signals produce the two desired CSB and SBO signal irradiation patterns.

Normally, the CSB and SBO signals are generated by a suitable transmitter connected to a distribution device or unit which splits the signal power and shifts the phase of the signals generated, in such a manner as to be able to supply parts of the SSB and SBO signals, having pre-defined phases and amplitudes, to each radiating element of the array.

The Applicant has noted that the conventional GP systems have performances which are strongly dependent on the presence or absence of reflecting obstacles within the area of installation of such a system, and on the characteristics of the ground in front of the antenna (slope, rugosity etc.). That makes the choice of the site in which to install the antenna, which will, however, have to be in close proximity to the landing runway, particularly problematic.

SUMMARY OF THE INVENTION

The Applicant has researched a solution to this problem which does not lead to the manufacture of excessively complex and costly equipment.

In particular, it has been observed that the array type signal distribution device places a significant economic burden over the entire cost of the system. The problems set out above are resolved by a signal distribution device 22 for the glide guidance component of an instrumental landing system ILS, including an array of antenna elements (A1-A12) installed on a pylon placed on a supporting surface (GR), the device comprising:
  a first and a second input for receiving a CSB input signal and an SBO input signal respectively,
  a plurality of outputs (OU1-OU12) connectable to the array and including a first (OU5) and a second (OU8) output for a first and a second output signals, respectively; each of said output signals including a CSB component and an SBO component,
  means for phase shifting and for distributing 40, 50 the SBO and CSB input signals over the plurality of outputs, said means being such that the array is of the image-less type and the first and the second output signals have substantially the same amplitude values and have a difference between the phases of the respective CSB components substantially equal to a difference between the phases of the respective SBO components.

Preferred embodiments of such a device are defined within the appended claims 2 to 11.

BRIEF DESCRIPTION OF THE DRAWINGS

In order to better understand the invention and to appreciate the advantages, some of its non-limiting exemplificative embodiments are described in the following, making reference to the enclosed drawings, wherein.

MORE DETAILED DESCRIPTION

Figure 1:
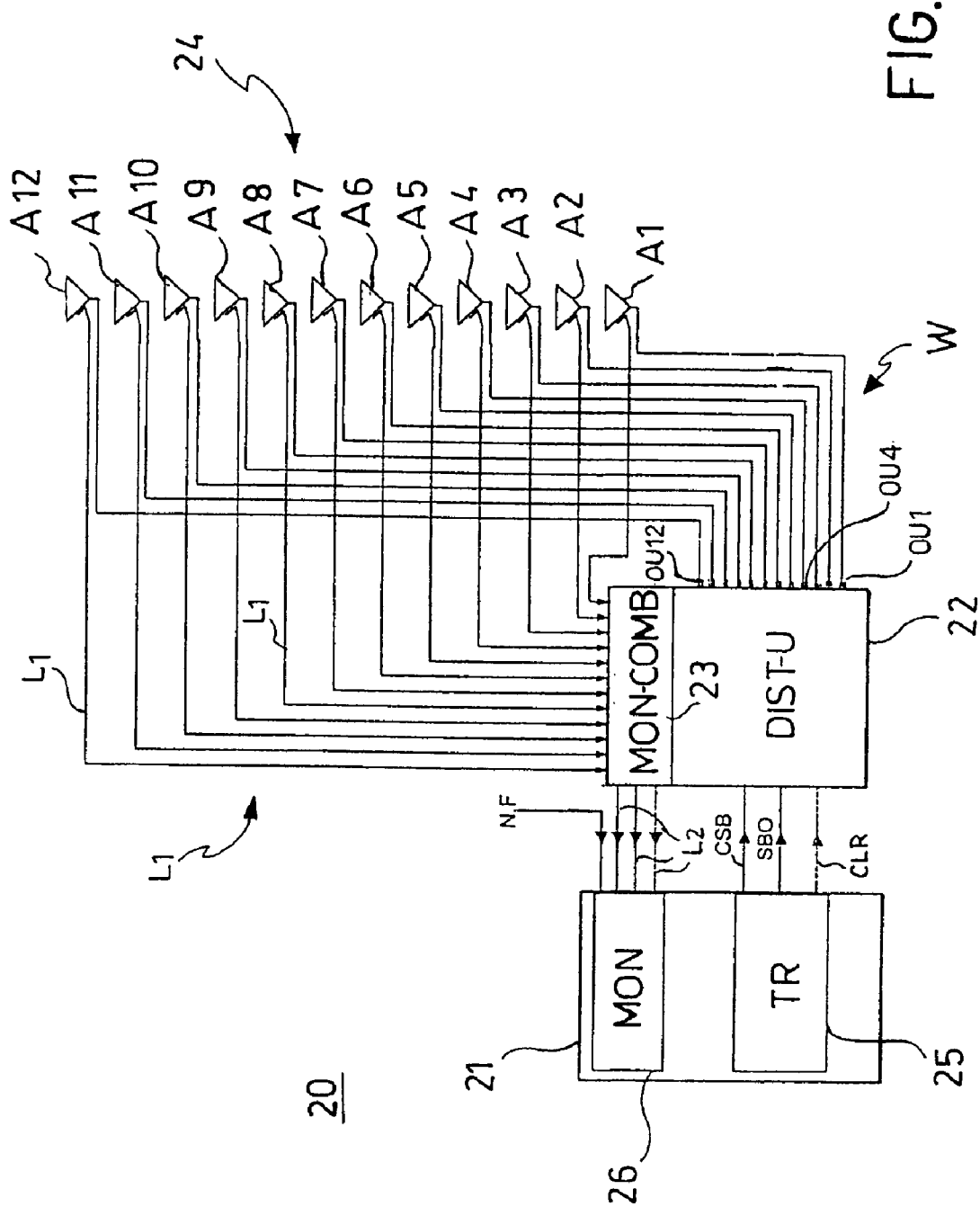
FIG. 1 shows one particular embodiment of an apparatus for the indication of glide path.

FIG. 1 schematically shows one example of a system or apparatus for the indication of descent or glide path 20 (more briefly, "glide path system"; according to English nomenclature) including supply equipment 21 (preferably also carrying out a monitoring function), a signal distribution device or unit for guiding the glide (DIST-U) 22 and a beacon system 24 including a curtain or array of antenna elements or radiating elements A1-A12.

The glide path system 20 is suitable for being used in an instrumental landing system (ILS) installed within an airport. The glide path system 20 allows the sending of signals, to an aircraft whilst landing on a specific runway, which are indicative of the angle of inclination with respect to the horizon, which it is desired for the aircraft to assume during landing.

In particular, the glide path system 20 is of such a type as to irradiate guide signals or "course signals" comprising a CSB signal, i.e. a "carrier plus side band" signal, and an SBO signal, i.e. a side band only signal. The general characteristics of the CSB and SBO signals, as well as the methods of their use by aircraft during descent, are well known to any ILS systems expert and therefore will not be described in any further detail.

The glide path system 20 may be of the so-called 1F type, i.e. emitting only course signals, or may be of the 2F type and also allows the additional irradiation of a clearance signal CLR, which, as is well known, indicates to the aircraft the entry of the same into an angular sector unsuitable for descent.

With reference to the structure of the glide path system 20, the transmission and monitoring apparatus 21 includes a transmitter device 25 (TR), entirely conventional in itself, for the generation of the CSB, SBO and clearance CLR signals. In particular, the transmitter device 25 carries out the amplitude modulation of a carrier signal (generated by an oscillator, not shown) for the construction of the SBO and CSB signals. The clearance signal CLR is generated by using another suitable oscillator, not shown.

For example, the CSB and SBO signals for the beacon system 24 are centred around the same frequency comprised of between 328 and 336 MHz, whilst the clearance signal CLR is centred around a separate frequency which is comprised within the same interval and, for example, bandshifted by 12 KHz with respect to that of the CSB and SBO signals.

The transmission device 25 has output lines for the CSB, SBO and clearance CLR signals (indicated in the figure by the same symbol as the signal which they convey) connected to corresponding inputs on the distribution unit 22. The distribution unit 22 is equipped with a plurality of output supply lines generally indicated by W (for example, coaxial cables) each connected to one of the radiating elements A1-A12 of the beacon system 24.

Additionally, the supply apparatus 21 includes a monitoring device (MON) 26 adapted to receiving signals deriving from some or all of the radiating elements A1-A12 of the beacon system 24. Preferably, the antenna array of the system 24 is connected to first monitoring lines or cables $L_1$ which transport monitoring signals detected by the radiating elements A1-A12 by using appropriate conventional type probes (not shown).

The first lines L1 are connected to a monitoring multiplexer and combiner device 23 (MON-COM) which allows the selection of some of the derived signals redirecting them towards one or more second lines $L_2$ connected to a monitoring device 26.

According to one preferred execution example, a near field NF signal, which is sampleable from an additional antenna (typically a dipolar antenna, not shown), arranged in close proximity to the beacon system 24 (for example at a distance of 80 meters from the latter), is also fed to the (conventional) monitoring device 26. As is clear to experts in the art, such an additional antenna receives part of the radiation emitted from the beacon system 24 and supplies a monitoring signal to be fed into the NF input of the monitoring device 26, from which information on the correct operation of the beacon system 24 itself may be obtained.

Figure 2:
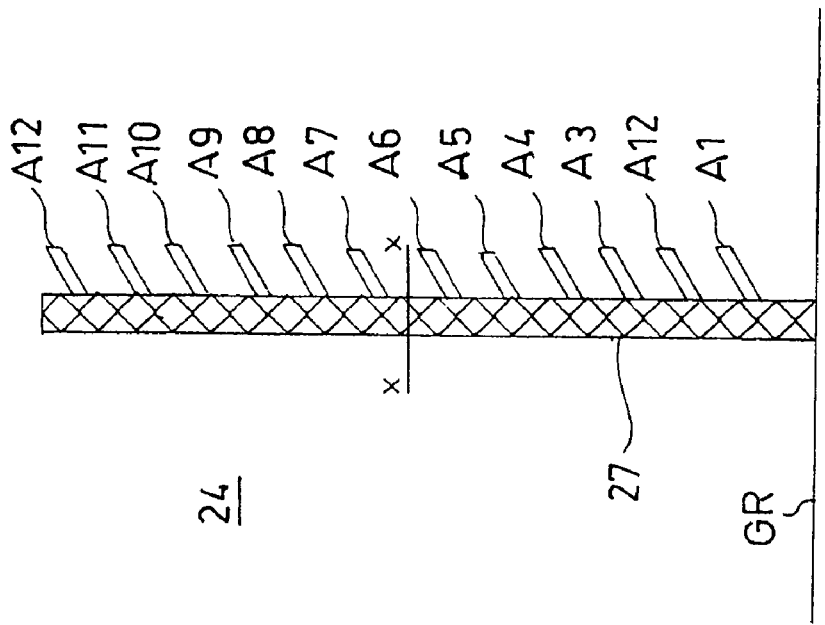
FIG. 2 schematically shows an antenna system which is utilisable in said apparatus.

In FIG. 2 is schematically shown the beacon system 24 including, according to the example considered, twelve antenna elements indicated as A1-A12, organised as an array and mounted on a mast or supporting pylon 27 fixed onto a surface GR (typically land or the ground). The antenna elements A1-A12 are spaced apart from one another in an appropriate manner. According to one preferred form of execution the supporting pylon 27 is realisable in four overlapping aluminium blocks (each dedicated to supporting three antenna elements). For example, the overall height of the pylon is approx. 15 m. Considering a reference axis x-x, substantially transversal and median to the supporting pylon 27, a group of upper radiating elements A7-A12 and a group of lower radiating elements A1-A6 are differentiated. According to the numbering system selected, radiating element A1 is the lowest, whilst radiating element A12 is that which is positioned the highest with respect to the ground. This reference axis x-x may be incorporated into the phase centre of the irradiated wave plane.

Furthermore, it is possible to identify pairs of radiating elements which are symmetrical to one another or which, in other words, occupy the same position within their respective upper and lower groups. For example, radiating elements A5 and A8 are symmetrical in as much as they both occupy the fifth position starting from their respective extreme outermost elements, A1 and A12. It is observed that it is not essential that two symmetrical radiating elements be also equidistant from the reference axis x-x. The supporting pylon 27 is arranged transversally with respect to the ground GR i.e. forming an angle of approx. 90° (with the pylon in the vertical position) or an angle of less than 90° (with the pylon inclined with respect to the vertical axis).

Advantageously, the antenna system 24 is substantially of the image-less type, i.e. it is structured and works in such a manner as to produce CSB and SBO signal radiation patterns which are substantially independent of reflection from the surface GR upon which the antenna system itself is installed. In other words, the antenna system is structured and works in such a manner that the respective CSB and SBO signal irradiation patterns have strongly attenuated irradiated power values below the horizon and therefore, such irradiation patterns have characteristics which are substantially independent of the surface or ground GR. It is observed, that total independence from the surrounding land is purely ideal.

Therefore, it is entirely possible that there is a restricted area (for example, with a radius of less than approx. 100 m) around the ground GR installation area of the antenna system 24 wherein the reflection of the ground itself exercises a certain amount of influence over the patterns; outside of this area, the reflection plays a practically negligible role.

Figure 3:
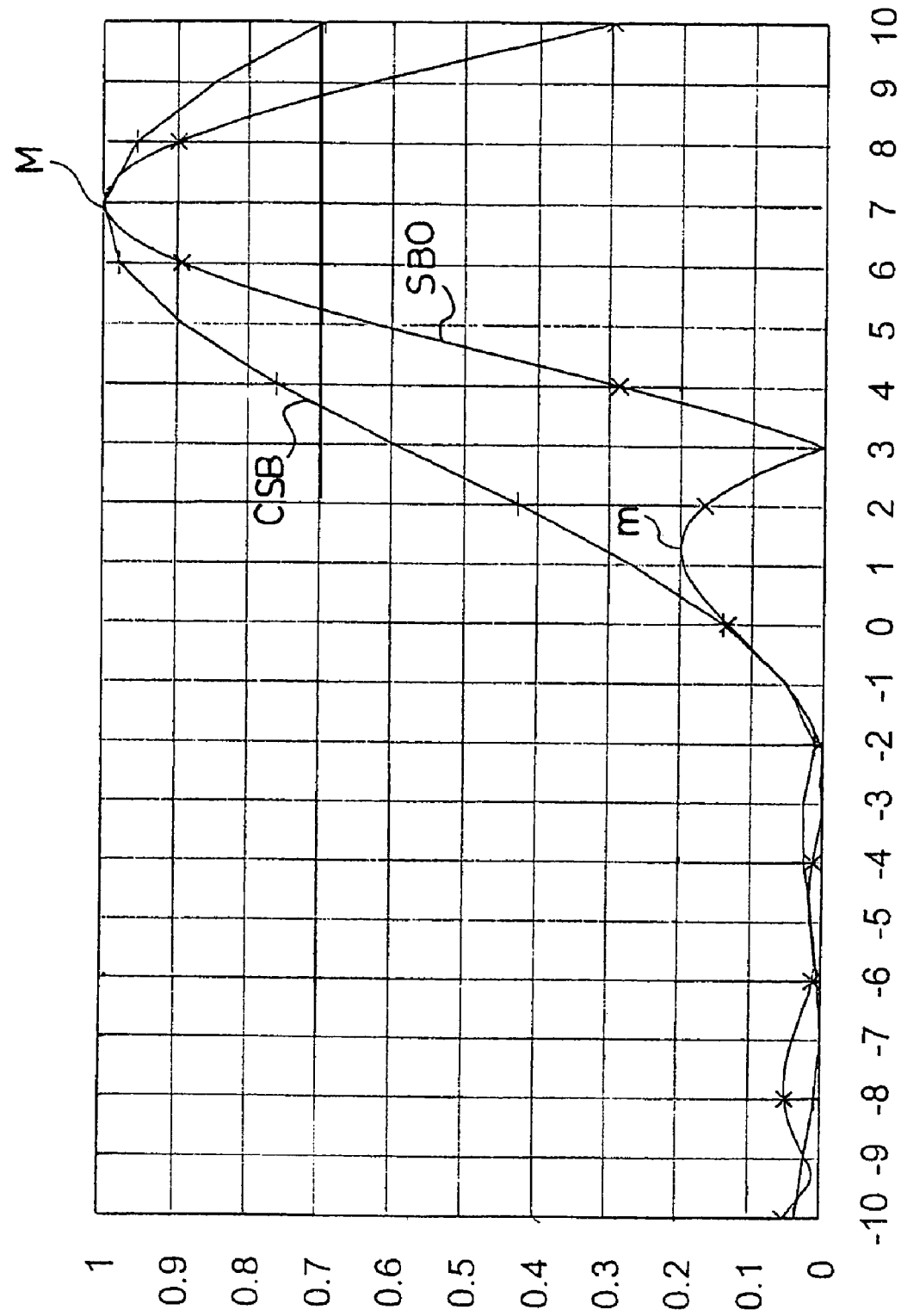
FIG. 3 shows one particular form of the radiation patterns for the CSB and SBO signals obtainable using said apparatus.

In particular, FIG. 3 shows a preferred example of the CSB and SBO signal irradiation patterns obtainable with the antenna system 24. In FIG. 3, on the Y axis are represented (in degrees) the angles of inclination with respect to a plane parallel to the horizon and crossing, for example, over the reference axis x-x of the supporting pylon 27, whilst, on the X axis are represented the values, normalised to the maximum value, of the amplitude of the electrical field E of the CSB and SBO signals.

The CSB signal irradiation pattern shown in FIG. 3 has a lobe having a maxima M, centred on an angle equal to 7° (as is known, positive angular values are meant as being those measured above the horizon), which attenuates upon approaching the horizon, having at an angle of 0°, an amplitude of less than 20% of that of its maximum M. It is observed that for angles of less than 0°, the amplitude of the CSB signal remains less than 15% of the maximum value M and that for negative angles, less than around −1°, the amplitude is approximately held to within 5% of the maximum value M.

The SBO signal irradiation pattern has a main lobe having the corresponding maximum M (equal to that of the CSB pattern) for the same angular value (7°, according to the example) of that of the CSB signal pattern.

Furthermore, the pattern has a first null for an angle equal to 3°, in accordance with the standards for ILS systems. Furthermore, from the first null at 3° departs a secondary lobe having a corresponding maximum equal to approx. 20% of the maximum value M and which occurs for an angle of approx. 1.5°. For the angle equal to 0° the secondary lobe assumes an amplitude value equal to approx. 15% of the maximum value M. For angles having values of less than −1°, the amplitude of the SBO signal pattern is contained within 5% of the maximum value M. It is observed that the SBO signal radiation pattern is more directional than that of the CSB signal and that the principal lobe and the secondary lobe of the SBO signal assume amplitude values which are less than those assumed for the same angles of the CSB signal pattern.

It is observed that, whereas the antenna system 12 is of the image-less type, the null at 3° is obtained in a manner that is substantially independent of the presence of the ground GR.

Figure 4A:
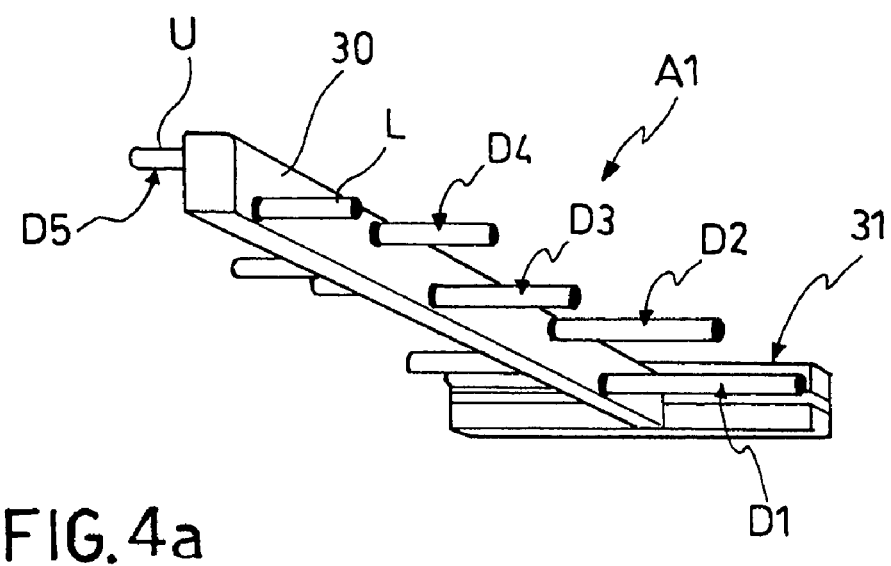
FIGS. 4a, 4b, 4c show respectively a perspective view, a plan view and a side view of a radiating element which is utilisable for the antenna system of FIG. 2.
Figure 4B:
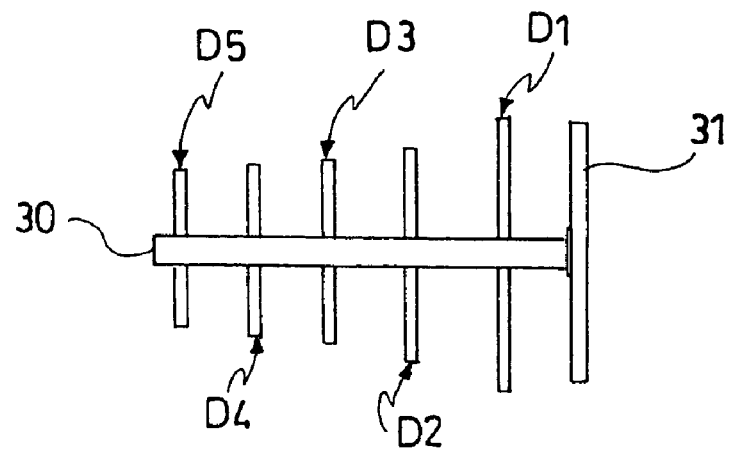
Figure 4C:
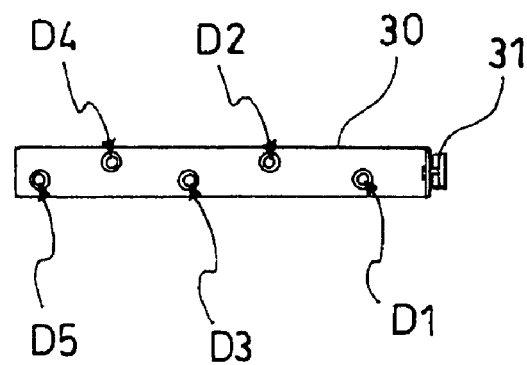

According to one particular form of execution of the invention, each radiating element A1-A12, is in turn, an array and, in particular, is of the end-fire type. FIGS. 4a, 4b and 4c show an example of such an end-fire array for a $j^{th}$ radiating element of the antenna system 24, for example, radiating element A1.

The radiating element A1 includes a plurality of dipoles D1-D5 (in particular, five dipoles) arranged externally and transversally to a median body or radome 30 housing a supply line which comprises, for example, several square cross-section tubular guides made of aluminium or another suitable metal. The median body 30 plays a protective role for the dipole DS1-D5 supply line, in such a manner as to avoid that any inclement weather (rain, snow etc.) may disturb the field irradiated by the dipoles.

The median body 30, for example, a protective fibreglass structure, is mechanically fixed to the supporting pylon 27 through a supporting element 31, which is transversal to the body itself. Such a supporting element may advantageously include mechanical means which allow altering the inclination of the radiating element A1 with respect to the pylon, for modifying the irradiation pattern associated with the antenna system 24 and to alter the position of the antenna along the perpendicular to the axis of the pylon.

The dipoles D1-D5 have corresponding lengths which reduce with increasing distance away from the supporting pylon 27 towards the free end of the median body 30. Such dipoles D1-D5 are supplied in such a manner as to produce maximum radiation in the direction perpendicular to the dipoles and towards the shortest dipole D5, whilst the radiation in the opposite direction is strongly reduced.

Each dipole D1-D5 includes an upper tubular radiating element U an a lower tubular radiating element L (indicated in FIG. 4a only for dipole D5), which extends in a direction opposite to that of the median body 30 identifying axes which are parallel and misaligned form one another. The tubular elements U of each dipole are electrically connected to an upper metallic tube (not visible in the figure) perpendicular to the dipoles whilst those L are connected to a lower metallic tube (not visible in the figure). Facing one another, these metallic tubes behave as balanced feed lines for dipoles D1-D5. Supplying the balanced line is achieved by using a coaxial cable arranged internally to the upper tube, and by a printed circuit board PCB (not shown) including components which are distributed and arranged over the front edge of the corresponding antenna element A1-A12 within the radome 30.

The radiating element A1 has, for example, a gain of 9 db with respect to an isotropic source. Advantageously, the metallic parts of the radiating elements A1-A12 are connected to earth thus providing protection against lightening strikes.

It is observed that the radiating element A1 shown in FIGS. 4a-4c is achievable by using an antenna produced by the Applicant herself and denominated AAN 104 (wherein AAN is an acronym of Antenna for Air Navigation). Preferably, radiating element A1 is equipped with an additional printed circuit board having a "TNC" (Threaded Neil-Concelman) type output connecter which constitutes the probe connected to the monitoring multiplexer 23. Exemplificatively, such a probe may have a coupling of 25±2 dB.

For the supply of the (CSB, SBO and clearance CLR) radiofrequency signals emerging from one of the coaxial cables W, radiating element A1 includes an input connecter (not shown in FIGS. 4a-4c) formed, for example, by using a conventional "N" type connecter, having a nominal input impedance of 50 ohms.

Figure 5:
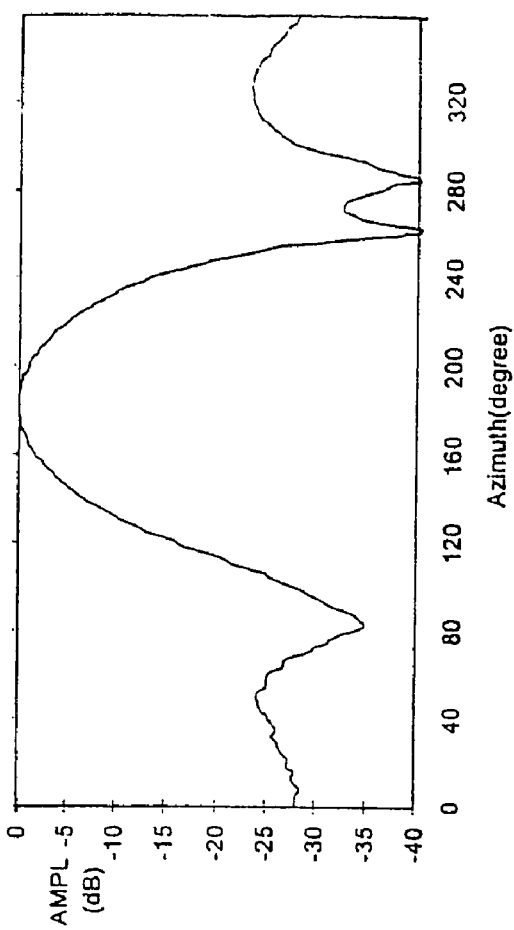
FIG. 5 shows one possible radiation pattern from a radiating element such as that of FIGS. 4a, 4b, 4c.

In FIG. 5, for the sake of completeness of description, is shown one possible course of the irradiation pattern of one of the radiating elements A1-A12. The diagram of FIG. 5 shows the amplitude AMPL expressed in dB with respect to the azimuth (expressed in degrees), examined in the horizontal plane. The diagram of FIG. 5 is measured for a frequency of 332 MHz.

It is observed that the use of an array, preferably of the end-fire type, in the manufacture of each of the radiating elements A1-A12, is more advantageous with respect to the use of a single dipole associated with a reflecting element, since the array allows the achievement of greater directivity in the horizontal and in the vertical planes. From the diagram of FIG. 5, is elicited how the corresponding antenna radiating element is particularly appropriate for installation sites in which there are no significant reflecting obstructions within a sector comprised of between −35° and +35°, with respect to the direction of advancement of the aircraft.

Alternatively to a radiating element such as that shown in FIGS. 4a-4c, it is possible to use two "twin" antennas, each of which is, for example, made of a radiating element analogous to that A1 described and represented above, for each radiating element A1-A12. For example, a radiating element denominated AAN 104-2, which allows the attainment of superior directivities to those of the element AAN 104 is utilisable, being particularly advantageous in the presence of significant laterally reflecting obstructions. Indeed, radiating element AAN 104-2 allows the attainment of a narrower principal radiation lobe in the horizontal plane than that of radiating element AAN 104 and, for example, such as not to have reflection problems for a sector comprised of between −15° and +15°, with respect to the direction of advancement.

One such radiating element including two twin antennas (not shown in the figures), is supplyable by using a conventional power splitter (not shown) positionable on the supporting pylon 27, which divides between the two end-fire arrays, the signal coming from one cable of the coaxial cables W emerging from the distribution unit 22. For example, one irradiation element A1 including two twin antennas suitable for the present invention may have a gain of (+)12 dB with respect to an isotropic source. Advantageously, besides the power splitter, for each twin-type antenna element may be envisaged a combiner, which couples to a single output and, hence, to a monitoring cable L1, the signals originating from each probe with which each of the two antennas of the radiating element itself is equipped.

With reference to the distribution unit 22 shown in FIG. 1, it is observed that this comprises a plurality of outputs OU1-OU12 (for clarity of representation, not all are shown in FIG. 2) each connected to a corresponding radiating element A1-A12 (having the same identification number). Furthermore, the plurality of outputs OU1-OU12 includes a first sub-plurality of output ports (for example, the outputs from OU3 to OU10) which supply a signal including a CSB component and an SBO component, each obtained by the appropriate phase shifting and appropriate splitting of the CSB and SBO signals supplied to the distribution unit itself. For a second sub-plurality of outputs (for example, OU1, OU2, OU11 and OU12) the SBO component may be present without that of the CSB. Furthermore, the clearance signal CLR, suitably phase shifted and split in power, may be made available to some of the outputs of the distribution unit 22 such as, for example, outputs OU1, OU2, OU6, OU7, OU11 and OU12 together with the CSB and/or SBO components.

Within the scope of the present invention, by the expression "amplitude/phase of a signal present upon any defined output" is meant the amplitude/the phase of the electrical voltage associated with the electromagnetic field which propagates within a generic transmission line in accordance with transmission line theory, having that specific output, with reference to a signal which is normalised (0 dB amplitude and a phase of 0°).

It is observed that the distribution unit 22 of the invention is configured in such a manner that the amplitudes and the phases of the signals emitted are such as to give rise to image-less radiation patterns, at the same time respecting a particular relationship between the amplitudes and the phases of the output signals.

In greater detail, the distribution unit 22 is manufactured and configured in such a manner that, during operation, at least two of the outputs OU3-OU10 have substantially the same amplitude value for the CSB and/or SBO components (henceforth, such outputs will also be indicated as equal amplitude outputs).

Furthermore, a phase relationship is established according to which the difference between the phases of the CSB components over two equal amplitude outputs for the CSB and/or SBO components is substantially equal to the difference between the phases of the SBO components present over the two same outputs.

With reference to the notations used in the continuation of this description, it is observed that, in general, in considering an $i^{th}$ output port OUi the phase of the CSB component at output OUi will be indicated by the symbol $\Phi(OUi,CSB)$ The phase at other outputs OUj or for the SBO component will be indicated in an analogous manner (for example, $\Phi(OUj, SBO)$).

The output pair OUi and OUj are considered as having corresponding CSB components with the same amplitude value and corresponding SBO components with the same additional amplitude value. The difference $\Delta\Phi_{i-jCSB}$ between the phases of the CSB components at the two outputs and the difference $\Delta\Phi_{i-jSBO}$ between the phases of the SBO components at the two outputs are estimated:

$$\Phi(OUi,CSB)-\Phi(OUj,CSB)=\Delta\Phi_{i-jCSB} \quad (1)$$

$$\Phi(OUi,SBO)-\Phi(OUj,SBO)=\Delta\Phi_{i-jSBO} \quad (2)$$

According to the aforesaid phase relationship it occurs that these two differences are the same:

$$\Delta\Phi_{i-jCSB}=\Delta\Phi_{i-jSBO} \quad (3)$$

Relationship (3) is valid for output pairs having equal amplitudes for the CSB and/or SBO components.

For example, during the supply of the array 24, output OU5 and output OU8 have corresponding CSB components having the same amplitude values. The difference between the phases $\Phi(OU8,CSB)$ and $\Phi(OU5,CSB)$ is indicated by $\Delta\Phi_{8-5CSB}$, i.e. the difference between the CSB signal phase at the same outputs.

Analogously, the phase difference $\Delta\Phi_{8-5SBO}$ in relation to the SBO component should be considered.

In accordance with the phase relationship 3) introduced above, the two phase differences $\Delta\Phi_{8-5CSB}$ and $\Delta\Phi_{8-5SBO}$ are substantially equal:

$$\Delta\Phi_{8-5CSB}=\Delta\Phi_{8-5SBO} \quad (a)$$

Preferably, the distribution unit 22 includes many outputs having equal amplitude for the CSB component or that of the SBO (for example, the symmetrical output pair OU4 and OU9 and the symmetrical output pair OU3 and OU10). In such a case, the phase relationship indicated above is also valid for other or for all outputs which have equal amplitudes for the SBO and/or CSB components, for example.

$$\Delta\Phi_{9-4CSB}=\Delta\Phi_{9-4SBO}, \Delta\Phi_{10-3CSB}=\Delta\Phi_{10-3SBO} \quad (b)$$

According to one particularly advantageous form of execution of the invention, a particular phase relationship may also be verified between pairs of outputs at which a CSB and a SBO component are available, but which are not necessarily at equal amplitude. Regarding this, any two outputs OUn and OUm having different amplitude values for the CSB components and different amplitude values for the SBO components are considered. According to this additional form of execution, it occurs that the difference $\Delta\Phi_{n-mCSB}$ between the phases of the CSB components at the two outputs having unequal amplitudes and the difference $\Delta\Phi_{n-mSBO}$ between the phases of the SBO components at the two same outputs are substantially equal to one another:

$$\Delta\Phi_{n-mCSB}=\Delta\Phi_{n-mSBO} \text{ for each m and n} \quad (4)$$

For example, in accordance with relationship (4), it follows that:

$$\Delta\Phi_{9-4CSB}=\Delta\Phi_{9-4SBO}, \quad \Delta\Phi_{8-4CSB}=\Delta\Phi_{8-4SBO},$$
$$\Delta\Phi_{7-4CSB}=\Delta\Phi_{7-4SBO}, \Delta\Phi_{6-4CSB}=\Delta\Phi_{6-4SBO}, \text{ etcetera} \quad (c)$$

It should be noted that in the example, output OU4 has been considered, but any other output should bring about the same phase relationship.

Relationship (4) may also be expressed as:

$$\Phi(OUn,CSB)-\Phi(OUm,SBO)=\delta\Phi \quad (5)$$

with $\delta\Phi$ being substantially constant for each of the outputs having a CSB and SBO component simultaneously. In other words, the $\delta\Phi$ value is substantially identical for any pair of outputs OUm and OUn.

It should be noted that the Applicant has understood that the phase relationships expressed by equation (3) are not incompatible with the desired radiation patterns for the CSB and SBO signals and, at the same time, allow the simple and economical production of the distribution unit 22. As an additional advantage, the alignment of the tracking angle of the two CSB and SBO beams, through the modification of the phases of the irradiated signals, works in the same manner for the CSB and SBO signals, thus simplifying the procedure.

In table 1 are exemplificatively indicated some of the operative and structural characteristics of a antenna system 24, manufactured in accordance with the invention (it being manufactured with both AAN 104 and with AAN 104-2 type radiating elements). In particular, table 1 indicates:

- the amplitudes AMP, with the corresponding value in decibels, of the input electrical voltage V to each radiating element A1-A12 for the CSB component and the SBO component;
- the phases $\phi$ of the input electrical voltage V to each radiating element A1-A12 for the CSB component and for the SBO component;
- the distance SP in meters of each radiating element A1-A12, measured with respect to the reference axis x-x of the supporting pylon 27;

TABLE 1

|     | CSB  |      |      | SBO  |      |     |        |
|-----|------|------|------|------|------|-----|--------|
|     | AMP  | DB   | φ    | AMP  | DB   | φ   | SP (m) |
| A12 | —    | —    | —    | 0.48 | −6.4 | 184 | 6.6    |
| A11 | —    | —    | —    | 0.48 | −6.4 | 246 | 5.14   |
| A10 | 0.37 | −8.6 | 135  | 1    | 0    | 311 | 4.7    |
| A9  | 0.69 | −3.2 | 201  | 0.78 | −2.2 | 17  | 2.71   |
| A8  | 0.87 | −1.2 | 254  | 0.66 | −3.6 | 70  | 1.63   |
| A7  | 1    | 0    | 305  | 0.54 | −5.4 | 121 | 0.54   |
| A6  | 1    | 0    | 0    | 0.54 | −5.4 | 176 | −0.54  |

TABLE 1-continued

|    | CSB  |      |     | SBO  |      |     |         |
|----|------|------|-----|------|------|-----|---------|
|    | AMP  | DB   | φ   | AMP  | DB   | φ   | SP (m)  |
| A5 | 0.87 | −1.2 | 45  | 0.66 | −3.6 | 221 | −1.63   |
| A4 | 0.69 | −3.2 | 95  | 0.78 | −2.2 | 271 | −2.71   |
| A3 | 0.37 | −8.6 | 173 | 1    | 0    | −11 | −3.92   |
| A2 | —    | —    | —   | 0.48 | −6.4 | 31  | −5.33   |
| A1 | —    | —    | —   | 0.48 | −6.4 | 116 | −6.59   |

It should be noted that, according to the example in table 1, the spacing between the radiating elements is not constant and therefore the upper group of radiating elements (i.e. those with positive values for the distance D) is not placed in an exactly symmetrical manner, with respect to the median point, and to the lower group of radiating elements (negative distance D values). This provides an extra degree of freedom for the optimisation of the patterns generated. With reference to the amplitudes AMP, it is possible to identify, both for the CSB component, and for the SBO component, pairs of symmetrical radiating elements within the lower and upper groups of elements having the same amplitude AMP value. For example, radiating elements A3 and A10 (both in the third position with respect to the reference axis x-x) both have a CSB component amplitude equal to −8.6 dB and an SBO component amplitude equal to 0 dB.

Considering the phase of the CSB component, it is observed that the radiating elements A3-A10 have different phase values from one another. An equal observation is valid for the phase values of the SBO component. Indeed, according to the example in table 1, not only is equation (3) satisfied in relation to symmetrical outputs, but also equation (4). Indeed, by assimilating the output phase and amplitude values Oui with those of the inputs for the radiating elements Ai (which indeed differ due to the phase shifting of the coaxial cables W) it may be verified that the above indicated examples (equations (a), (b) and (c)) are respected in table 1.

It is important to note that the distribution of the amplitudes and phases, specified exemplificatively in table 1, is due to that which the Applicant has perceived with regard to the advantages in terms of the simplicity and efficiency of the distribution unit 22 and is not exclusively correlated with or resulting from the choice of obtaining image-less type radiation patterns.

Figure 6:
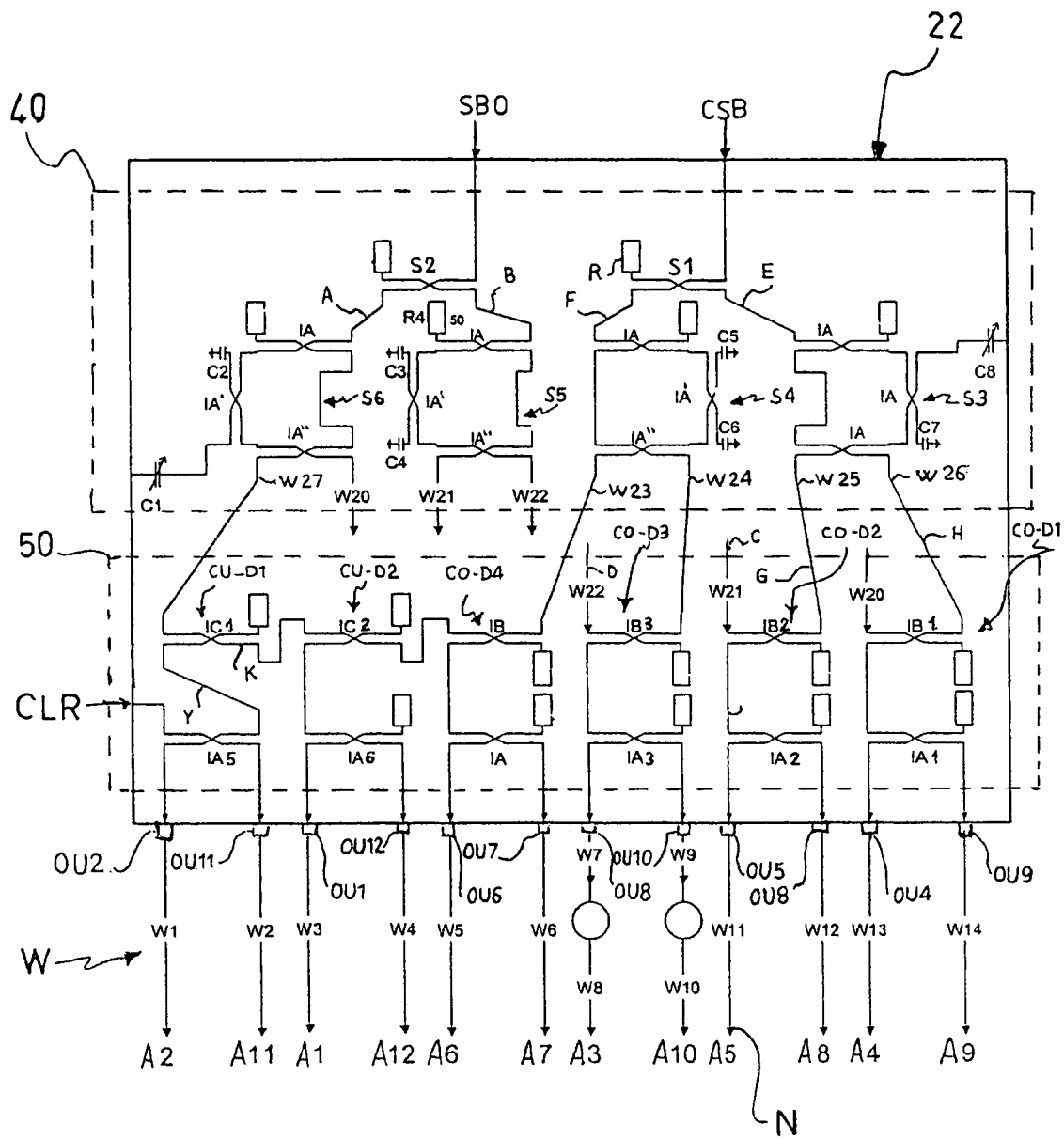
FIG. 6 shows a diagram of one preferred example of a distribution device, in accordance with the invention.

FIG. 6 shows one particular example embodiment of the distribution unit 22, in accordance with the invention. The distribution unit 22 is a distributed parameter circuit suited to allowing the propagation of radiofrequency signals.

In such FIG. 6, the components (such as the input and output ports) which are identical or analogous to those already described, are indicated with the same symbols and numerical references.

The distribution unit 22 comprises means of distribution and phase shifting of the CSB and SBO signals, including an input splitter block 40 connected to an output splitter-combiner block 50. The input splitter block 40 allows the splitting up of the amplitude and phase shifting the SBO and CSB signals, making them available over a plurality of intermediate output lines W20-W27.

The output splitter-combiner block 50 is of such a type as to perform the combination of the CSB and SBO signal parts present in some of the intermediate output lines W20-W27 and, therefore, their further splitting towards the outputs OU1-OU12 of the distribution unit 22. In particular, lines W20, W21 and W22 may be sized with lengths such as to respect equation (4) or not. In the preferred case now described, equation (4) is respected.

In greater detail, the splitter block 40 includes a first input splitter S1, having an input port connected to the CSB signal input, and a second input splitter S2, having a corresponding input port connected to the input carrying the SBO signal.

Each of the two input splitters S1 and S2 is accomplished, for example, by a conventional device manufactured using microstrip or strip-line technology, and works by splitting the signal in power, and hence in amplitude, thus making it available over two outputs. With particular reference to splitter S1 (represented in FIG. 6 in accordance with conventions known within the sector) the signal present at the CSB input is split over outputs F and E (with a preset splitting ratio) with different phase shift for each of the two outputs. In particular, the splitting ratio may be −3 dB, i.e. the signal is split equally. With reference to the phase shift, for output port E (directly aligned with the CSB input port) the phase shift introduced by splitter S1 is null, whilst for port F (crossed connection) splitter S1 introduces a phase shift of −90°. One of the four ports of the first splitter S1 is closed over a non reflective resistive load R (for example, with a resistance equal to 50 ohms). Entirely analogous considerations are also valid for the second splitter S2. For clarity of representation, the other resistive loads (having resistance values equal to or differing from 50 ohms) used within the distribution unit 22 are represented in FIG. 6 by a rectangle, without any identifying numbers or symbols.

Outputs E and F of the first splitter S1 are respectively connected to a third splitter S3 and a fourth splitter S4 having outputs W25-W26 and W23-W24, respectively. Advantageously, each of such splitters S3 and S4 is of such a type as to allow a phase shift over at least one of its own outputs differing from −90° and 0° and a splitting ratio of other than −3 dB. In particular, both the third splitter S3, and the fourth splitter S4 are manufacturable in a conventional manner using strip-line and include, according to one example embodiment, an input splitter IA, a adjusting splitter IA' and an output splitter IA", connected to one another as shown in FIG. 6.

The adjusting splitter IA' of the fourth splitter S4 is equipped with two outputs connected to capacitive loads C6 and C5 the preset value of which allows the establishment of the splitting ratio and the phase shift introduced by the splitter S4 itself. Advantageously, the third splitter S3 is of a variable type, in that it allows the operator to alter both the phase shift introduced and the splitting ratio for performing the fine adjusting of such parameters and obtain the desired values. With that aim, the adjusting splitter IA' of such a third splitter S3 is connected, besides to a fixed capacitance C7, additionally to a variable capacitance C8.

As is apparent from the basic outline in FIG. 6, the second input splitter S2 has output ports B and A connected to a fifth splitter S5 and a sixth splitter S6, respectively, analogous to the third S3 and to the fourth S4 splitters described above. The fifth splitter S5 and the sixth splitter S6 are equipped with capacitances C3, C4 and C3, C2 in such a manner as to obtain the appropriate splitting ratio and phase shift values 8 for example, differing from those of splitters S3 and S4). Advantageously, the sixth splitter S6 is of the variable type.

The output combiner-splitter block 50 includes three first combiners-splitters C0-D1, C0-D2, C0-D3 adapted to combining parts of the CSB and SBO signals and to splitting the signal obtained from the combination over two outputs OUi and OUj of the distribution unit 24. According to the example shown in FIG. 6, such combiners-splitters C0-D1, C0-D2, C0-D3 are manufactured in an analogous manner to one another and each includes an output combiner (IB1, IB2 or IB3) and an output splitter (IA1, IA2 and IA3) connected to one another.

Only the combiner-splitter indicated by the reference C0-D2, which includes the output combiner IB2 and the output splitter IA2 is considered. The output combiner IB2 has two inputs connected, respectively, to output W21 (carrying a part of the SBO signal) and to output W25 (carrying a part of the CSB signal). Such an output combiner IB2 allows combining two parts of the SBO and CSB signals emerging from the input splitting block 40 over a single output "I". In particular, such an output combiner IB2 (manufacturable with the same technology utilisable for the manufacture of one of the splitters S1-S6) performs a splitting in amplitude and a phase shift which may vary according to the inputs to which the parts of the CSB and SBO signals to be combined are applied.

Combiner IB2 output I is connected to output splitter IA2, in turn connected to outputs OU5 and OU8 which feed radiating elements A5 and A8, respectively. Output splitter IA2 (structurally analogous to splitters IA of input block 50) appropriately separates the overall signal present on output I (for example, it divides it into equal parts), does not phase shift the signal which it returns to output OU5 whilst it phase shifts by −90° the signal which it sends over output OU8. Both signals present over outputs OU5 and OU8 are made up of a CSB component and an SBO component.

Analogous considerations are valid for the other two splitters-combiners C0-D1 and C0-D3, as is apparent from the circuit diagram of FIG. 6 (at least for the specific phase shift and amplitude division values).

Furthermore, the output splitter-combiner block 50 is also equipped with an additional splitter-combiner device C0-D4 directly connected to output W23 and coupled to output W27 of input splitter block 40, in such a manner as to feed outputs OU6 and OU7. Such a splitter-combiner device CU-D4 is structurally analogous to those of C0-D1, C0-D2, C0-D3 described above.

The output splitter-combiner block 50 also includes two coupler-splitter devices CU-D1 and CU-D2, each including a corresponding coupler IC1 and IC2 and a corresponding splitter IA5 and IA6.

Couplers IC1 and IC2 are preset in such a manner that the signal received over one input is largely sent over one output (represented as being further away from the input) with only a very small part over the other output (represented as being closer to the input) For example, with reference to coupler IC1, 95% of the power present at input W27 is sent over output K and only 5% over output Y.

Splitter IA5 separates the part of the SBO signal sent to it over input Y over two outputs OU2 and OU11. Another splitter input IA5 receives the clearance signal CLR to be sent to the two outputs OU2 and OU11. Analogously, a part of the clearance signal may be applied to the port, indicated with a 50 ohm load, of the other splitters IA.

Preferably, all the couplers, splitters, combiners and the intermediate propagation lines are manufactured using microstrip technology. In particular, couplers, splitters and combiners deemed suitable for the present invention are manufactured and marketed by the company ANAREN (USA)

Coupler-splitter device CU-D2 sends part of the SBO signal to outputs OU1 and OU12 through coupler IC2 and splitter IA2.

Between the outputs OU1-OU12 of the distribution unit and the input connecters of each radiating element A1-A12 are interposed the propagation lines, generally indicated by W and realised, in particular, by lengths of coaxial cables W1-W14, of such lengths as to introduce an appropriate phase shift of the signals which propagate within their interior. Commensurate, variable, phase shifting elements (such as components 41 and 42) manufactured in a conventional manner may be envisaged, which allow the attainment of the desired input phase values for the radiating elements.

For example, the distribution unit 22 and the lengths of the coaxial cables W1-W14 are sized in accordance with that indicated in table 1, shown above and, i.e. in such a manner that over the inputs (diagrammatically represented by arrows in FIG. 6) of the radiating elements A1-A12 the desired values for the SBO, CSB components and for the clearance signal CLR are obtained.

With reference to the operation of the distribution unit 22, the phase shift which the CSB and SBO signals undergo over the path from the corresponding input ports to outputs OU5 and OU8 is, for example, considered.

Regarding this, in the following table 2 are shown the attenuations in dB (AMP column) undergone in the splitting over the output ports and the phase shifts (p column) to which the CSB signal and that of the SBO signal are subjected.

TABLE 2

| TEST POINT | SBO AMP = 0 dB | | CSB AMP = 0 dB | |
|---|---|---|---|---|
| | AMP (dB) | φ | AMP (dB) | φ |
| A | −3 | −90° | — | — |
| B | −3 | 0° | — | — |
| C | −3 − 5.2 = −8.2 | −Φ1 | — | — |
| D | −3 − 1.6 = −4.6 | −Φ2 | — | — |
| E | — | — | −3 | 0° |
| F | — | — | −3 | −90° |
| G | — | — | −3 − 4.1 = −7.1 | −Φ3 |
| H | — | — | −3 − 2.1 = −5.1 | −Φ4 |
| I | −8.2 − 5.3 = −13.5 | −Φ1 − Φ5 | −7.1 − 1.5 = −8.6 | −Φ3 − Φ6 |
| OU5 (L) | −13.5 − 3 = −16.5 | −Φ1 − Φ5 | −8.6 − 3 = −11.6 | −Φ3 − Φ6 |
| OU8 (M) | −13.5 − 3 = −16.5 | −Φ1 − Φ5 − 90° | −8.6 − 3 = −11.6 | −Φ3 − Φ6 − 90° |
| N (A5) | −16.5 | −Φ1 − Φ5 − 90° − Φ15 | −11.6 | −Φ3 − Φ6 − Φ15 |
| O (A8) | −16.5 | −Φ1 − Φ5 − 90° − Φ18 | −11.6 | −Φ3 − Φ6 − 90° − Φ18 |

The values are indicated for several test points A, B, C, D, I, N and O (also indicated in FIG. 6) corresponding to appropriate parts of the propagation circuit of the distribution unit 22. For simplicity of handling, the delays or phase shifts associated with each test point combine both those due to components such as splitters or combiners, and those introduced by propagation lines, such as lines W20-W27, which precede the test point according to the direction of propagation.

The CSB signal, intended for output OU5 and therefore for radiating element A5, undergoes the following phase shifts:

0° in test point E (null phase shift introduced by the first splitter S1);

−φ3 in test point G (wherein −φ3 phase shift is introduced by the third splitter S3);

−φ3-φ6 in test point I (wherein −φ6 is the phase shift introduced by the output combiner IB2, for input W25, of the combiner-splitter device C0-D2);

−φ3-φ6-0° over output port OU5 (wherein 0° is the null phase shift introduced by output splitter IA2 of the combiner-splitter device C0-D2);

The length of coaxial cable W11 introduces a phase shift −φ15 and, hence, −φ3-φ6-φ15, is the phase shift at test point N (corresponding to the input of radiating element A5).

Ultimately, the overall phase shift φ(OU5,CSB) of the CSB component over output OU5 is given by: φ(OU5,CSB)=−φ3-φ6.

With reference to the SBO signal present at the input of antenna A5, from analyses of table 2 and from FIG. 6 it is easily observed that the path is identified by test points B, C (i.e. W21), I, OU5, N. Hence, the SBO signal, intended for output OU5, undergoes the following phase shift:

0° in point B (null phase shift introduced by the second splitter S2);

−φ1 in point C (wherein −φ1 is the phase shift introduced by the fifth splitter S5);

−φ1-φ5 in point I (wherein −φ5 is the phase shift introduced by the output combiner IB2 of the combiner-splitter device C0-D2, for input WS21);

φ(OU5,CSB)=−φ1-φ5 is the total phase shift over output OU5; the phase shift introduced by output splitter IA2 is null for that output.

The overall phase shift at test point N is given by −φ1-φ5-φ15.

Radiating element A8 is now considered. The path followed by the CSB component is identified by the following test points: E, G, I, OU8. As may be easily derived from table 2, phase shift φ(OU8,CSB) obtained at output OU8 for the CSB signal is equal to:

$$\phi(OU8,CSB)=0°-\phi3-\phi6-90°$$

Wherein φ3 and −φ6 are the above defined phase shift. Coaxial cable W12 introduces a phase shift equal to −φ18.

The path followed by the SBO component is identified by the following test points: B, C, I, OU8. As may be easily derived from table 2, phase shift φ(OU8,SBO) obtained at output OU8 for the SBO signal is equal to:

$$\phi(OU8,SBO)=0°-\phi1-\phi5-90°$$

Ultimately, the difference between the phases of the CSB component over the two outputs is:

$$\Delta\Phi_{8-5CSB}=\phi(OU8,CSB)-\phi(OU5,CSB)=(-\phi3-\phi6-90°)-(-\phi3-\phi6)=-90°$$

Furthermore, the difference between the phases of the SBO component over the two outputs is:

$$\Delta\Phi_{8-5SBO}=\phi(OU8,SBO)-\phi(OU5,SBO)=-\phi1-\phi5-90°-(-\phi1-\phi5)=-90°$$

It is therefore verified that: $\Delta\Phi_{8-5CSB}=\Delta\Phi_{8-5SBO}$ This is in accordance with equation (3), indicated above.

The other components of the input splitter block and block 50 and the output splitter-combiner block 40 may be sized in an analogous manner to that already mentioned for realising the desired phase equations and obtaining outputs OUi and OUj for which equations (3) and (4) are respected. For example, for outputs OU3 and OU10, the phase shift values −φ2 and −φ4 (test points D and H) may be appropriately selected in such a manner as to satisfy the phase equation with the other outputs.

It is observed that the structure of the distribution unit 22 is particularly simple in that it contains a limited number of components (splitters, combiners, couplers) which allow reducing the costs of the unit itself. the phase equation (3) identified by the applicant has allowed carrying out the phase shift and splitting operations of the CSB and SBO signals suitable for the particular radiation pattern desired and, at the same time, is such as to limit the complexity of the distribution unit 22.

The fact that the glide-path system 20 includes an image-less type antenna system 24 has the significant advantage of allowing the installation of the antenna system itself even in areas of the airport in which the ground GR has irregularities and reflecting obstacles due, for example, to the presence of buildings or to the lack of any adequate and constant maintenance of the ground surface.

Obviously, to the ILS system and the distribution unit according to the present invention, an expert in the art, with the aim of satisfying contingent and specific requirements, might bring about additional modifications and variations, all moreover contained within the scope of protection of the invention, as defined by the following claims.

What is claims is:

1. A signal distribution device for a glide guidance component of an instrumental landing system (ILS), including an array of antenna elements installed on a pylon placed on a supporting surface (GR), the device comprising:

a first and a second input for receiving a CSB (carrier plus sideband) input signal and an SBO (sideband only) input signal respectively, a plurality of outputs connectable to the array and including a first and a second output for a first and a second output signals, respectively, each of said output signals including a CSB component and an SBO component, means for phase shifting and for distributing the SBO and CSB input signals over the plurality of outputs, wherein the array is of the image-less type configured to produce CSB and SBO signal radiation patterns that are substantially independent of reflection from the supporting surface, wherein CSB components of the first and the second output signals have substantially the same amplitude values as each other, and wherein SBO components of the first and second output signals have substantially the same amplitude values as each other, and a difference between the phases of the respective CSB components that have substantially the same amplitude values as each other is substantially equal to a difference between the phases of the respective SBO components that have substantially the same amplitude values as each other.

2. The device according to claim 1, wherein the plurality of outputs includes at least a third and a fourth output for a third and a fourth output signal, respectively, each of said third and fourth output signals including further CSB and SBO components; and wherein the third and the fourth output signals include amplitude values substantially identical to one another but differing from said amplitude values of the first and second output signals, and having a difference between the phases of the corresponding additional CSB components substantially equal to a difference between the phases of the corresponding SBO components.

3. The device according to claim 1, wherein said phase shifting means includes a distributed parameter circuit configured to propagate radiofrequency signals, the distributed parameter circuit comprising;

an input splitter block for splitting in amplitude and phase shifting the input SBO and CSB signals, making the input SBO and CSB signals available over a plurality of intermediate output lines, an output splitter-combiner block for carrying out a combination and an additional splitting of the portions of the input CSB and SBO signals present over some of the intermediate output lines and for distributing the corresponding CSB and SBO output signal components over the plurality of outputs.

4. The device according to claim 3, wherein said input splitter block includes:

a first splitter connected to said first input in and configured to separate the CSB input signal between two first output ports supplying two first split signals;

at least one second splitter configured to separate and phase shift one of the two first split signals sending parts of the CSB input signal over two first intermediate outputs.

5. The device according to claim 3, wherein said input splitter block includes:

a third splitter connected to said second input configured to separate the SBO input signal between two second output ports supplying two second split signals;

at least one fourth splitter configured to separate and phase shift one of the two second split signals sending parts of the SBO input signal over two second intermediate outputs.

6. The device according to claim 4, wherein said output splitter-combiner block includes at least one combiner-splitter device comprising:

a combiner having a first input port connected to one of said two first intermediate outputs and a second input port connected to one of said two second intermediate outputs, the combiner configured to send the CSB and SBO inputs over a combination output, an output splitter having an input connected to said combination output and having two separation ports, each port connected to one of said first and second outputs that provide CSB and SBO signal components.

7. The device according to claim 1, wherein said means are includes at least one adjustable splitter for introducing a phase shift which is adjustable by an operator.

8. The device according to claim 7, wherein said adjustable splitter comprises three further splitters of which one is connected to a variable capacitance.

9. The device according to claim 1, further comprising a further input for a "clearance" signal to be supplied to a group of said plurality of outputs.

10. The device according to claim 1, wherein the plurality of outputs includes at least a fifth and a sixth output for a fifth and a sixth output signal, respectively; each of said fifth and sixth output signals including corresponding CSB and SBO components; the fifth and the sixth output signals having corresponding amplitude values that are different from one another, and having a difference between the phases of the corresponding CSB components substantially equal to a difference between the phases of the corresponding SBO components.

11. The device according to claim 3, wherein said splitter block and said combiner-splitter block include components which are manufactured using microstrip technology.

* * * * *